US012348956B1

United States Patent
Wu et al.

(10) Patent No.: US 12,348,956 B1
(45) Date of Patent: Jul. 1, 2025

(54) METHOD FOR PROTECTING DATA IN A WIRELESS BODY AREA NETWORK (WBAN) SYSTEM

(71) Applicant: XUZHOU MEDICAL UNIVERSITY, Xuzhou (CN)

(72) Inventors: Xiang Wu, Xuzhou (CN); Youbing Xia, Xuzhou (CN); Yongting Zhang, Xuzhou (CN); Lili Wang, Xuzhou (CN); Xiao Zhang, Xuzhou (CN)

(73) Assignee: XUZHOU MEDICAL UNIVERSITY, Xuzhou (CN)

( * ) Notice: Subject to any disclaimer, the term of this patent is extended or adjusted under 35 U.S.C. 154(b) by 0 days.

(21) Appl. No.: 19/006,065

(22) Filed: Dec. 30, 2024

(30) Foreign Application Priority Data

Apr. 30, 2024 (CN) .......................... 202410534117.1

(51) Int. Cl.
*H04W 12/03* (2021.01)
*H04B 13/00* (2006.01)
*H04L 9/00* (2022.01)
*H04W 12/67* (2021.01)

(52) U.S. Cl.
CPC .......... *H04W 12/03* (2021.01); *H04B 13/005* (2013.01); *H04L 9/008* (2013.01); *H04W 12/67* (2021.01); *H04L 2209/80* (2013.01)

(58) Field of Classification Search
CPC .... H04L 9/008; H04L 2209/80; H04W 12/03; H04W 12/67; H04B 13/005
See application file for complete search history.

(56) References Cited

U.S. PATENT DOCUMENTS

| | | | |
|---|---|---|---|
| 9,888,853 B2* | 2/2018 | Cao | A61B 5/746 |
| 2013/0178150 A1* | 7/2013 | Park | H04W 4/80 |
| | | | 455/11.1 |
| 2016/0135685 A1* | 5/2016 | Cao | A61B 5/0024 |
| | | | 600/300 |
| 2016/0300252 A1* | 10/2016 | Frank | G06F 21/6245 |
| 2017/0042425 A1* | 2/2017 | Ramlall | A61B 5/0024 |

(Continued)

FOREIGN PATENT DOCUMENTS

| CN | 110222058 A | 9/2019 |
|---|---|---|
| CN | 114003917 A | 2/2022 |

OTHER PUBLICATIONS

LI Yi-lin, "Intrusion Risk Assessment Simulation of Big Data Privacy Information Transmission in Complex Network", Computer Simulation, vol. 37, No. 6, Jun. 15, 2020, pp. 156-159, 164.

*Primary Examiner* — Gary S Gracia

(57) ABSTRACT

A method for protecting data in a Wireless Body Area Network (WBAN) system is performed as follows. A current status of a data in a WBAN system is monitored and obtained. A potential risk to the data in the current status is assessed based on nodes in the WBAN system and a path between the nodes. A risk level of the WBAN system is quantified by calculating a risk degree of the potential risk under attack methods. First protection schemes are selected from a second protection schemes based on the risk level of the WBAN system. The first protection schemes are evaluated based on Analytic Hierarchy Process (AHP), by taking the attack methods, an utility and an efficiency of the first protection schemes as evaluation indicators to select a third protection scheme from the first protection schemes. The data is processed according to the third protection scheme.

5 Claims, 14 Drawing Sheets

(56) References Cited

U.S. PATENT DOCUMENTS

| | | | |
|---|---|---|---|
| 2017/0155427 A1* | 6/2017 | Hasan | G16H 40/67 |
| 2017/0164422 A1* | 6/2017 | Subramani | H04W 84/18 |
| 2017/0170924 A1* | 6/2017 | Soro | H04L 1/0002 |
| 2017/0238250 A1* | 8/2017 | Guo | H04W 4/80 370/311 |
| 2017/0347887 A1* | 12/2017 | Jin | A61B 5/0024 |
| 2018/0167266 A1* | 6/2018 | Subramani | A61B 5/0024 |
| 2020/0174055 A1* | 6/2020 | Pampattiwar | H04W 24/02 |
| 2021/0290102 A1* | 9/2021 | Burwinkel | A61B 5/398 |
| 2021/0290135 A1* | 9/2021 | Burwinkel | H04R 1/1041 |
| 2021/0319894 A1* | 10/2021 | Sobol | G16H 20/30 |
| 2021/0369173 A1* | 12/2021 | Ghose | A61B 5/0006 |
| 2022/0160309 A1* | 5/2022 | Poltorak | A61B 5/7264 |
| 2023/0075612 A1* | 3/2023 | Xie | H04W 84/18 |
| 2023/0401336 A1* | 12/2023 | LaFever | G06F 21/6245 |
| 2024/0267737 A1* | 8/2024 | Messous | H04W 12/122 |
| 2025/0048105 A1* | 2/2025 | Syed | H04W 12/122 |

* cited by examiner

| Risk indicator | P(%) | L(%) | Normalized D(%) |
|---|---|---|---|
| Addition | 10.51 | 9.5 | 2.65 |
| Deletion | 0.79 | 3.8 | 0.09 |
| Modification | 6.33 | 4.6 | 0.76 |
| Query | 31.41 | 27.6 | 22.96 |
| Restriction | 50.96 | 54.5 | 73.54 |

Fig. 2

|    | Utility | | Attack Method | | Efficiency | | Total |
|----|---------|--------|---------------|--------|------------|--------|-------|
|    | Score   | Weight | Score         | Weight | Score      | Weight | Score |
| DP | 0.167   |        | 0.143         |        | 0.875      |        | 0.203 |
|    |         | 0.279  |               | 0.649  |            | 0.072  |       |
| EN | 0.833   |        | 0.857         |        | 0.125      |        | 0.797 |

Fig. 3

(b) Results of multi-node model

| Indicator | SVM (Linear) | SVM (SMO) | Logistic | Naive Bayes | Bi-LSTM (Early Fusion) | Single-node model |
|---|---|---|---|---|---|---|
| Precision | 0.88 | 0.90 | 0.79 | 0.82 | 0.85 | 0.96 |
| Recall rate | 0.89 | 0.88 | 0.80 | 0.82 | 0.87 | 0.96 |
| F1 score | 0.88 | 0.88 | 0.80 | 0.82 | 0.86 | 0.96 |
| Accuracy | 0.90 | 0.87 | 0.80 | 0.81 | 0.80 | 0.96 |

Fig. 6

| Indicator | LWF | Multi-node model |
| :---: | :---: | :---: |
| Precision | 0.5 | 0.91 |
| Recall rate | 0.32 | 0.90 |
| F1 score | 0.39 | 0.90 |
| Accuracy | 0.64 | 0.91 |

Fig. 7

| Scale | Meaning ($a_i$ vs $a_j$) |
|---|---|
| 1 | The former is equally important as the latter |
| 3 | The former is slightly more important than the latter |
| 5 | The former is obviously more important than the latter |
| 7 | The former is significantly more important than the latter |
| 9 | The former is extremely more important than the latter |
| 2, 4, 6, 8 | The intermediate value between the two adjacent judgments above |
| The reciprocal of the above value | Compare the importance of swapping the order of two factors |

Fig. 8

| Order of Matrix | 1 | 2 | 3 | 4 | 5 | 6 | 7 | 8 | 9 | 10 | 11 | 12 | 13 |
|---|---|---|---|---|---|---|---|---|---|---|---|---|---|
| R.I. | 0 | 0 | 0.58 | 0.90 | 1.12 | 1.24 | 1.32 | 1.41 | 1.45 | 1.49 | 1.51 | 1.54 | 1.56 |

Fig. 9

METHOD FOR PROTECTING DATA IN A WIRELESS BODY AREA NETWORK (WBAN) SYSTEM

CROSS-REFERENCE TO RELATED APPLICATIONS

This application claims the benefit of priority from Chinese Patent Application No. 202410534117.1, filed on Apr. 30, 2024. The content of the aforementioned application, including any intervening amendments made thereto, is incorporated herein by reference in its entirety.

TECHNICAL FIELD

This application relates to data secure computing technology, and more particularly to a method for protecting data in a Wireless Body Area Network (WBAN) system.

BACKGROUND

With the increasingly serious issue of global population aging, technologies such as WBAN system have been widely applied in healthcare institutions for assessing, monitoring, and providing early warnings about patients' health conditions. By deploying various sensor devices, WBAN system can remotely monitor vital signs related to patients' health information, such as blood pressure, body temperature, heart rate, electrocardiogram (ECG), electromyogram (EMG), and electroencephalogram (EEG). The core value of these capabilities lies in providing massive data support for subsequent data mining and analysis. However, since sensitive vital signs like ECG applied to biometric verification, attackers may exploit this data to identify specific patients and steal more valuable information. To address this issue, numerous privacy protection schemes have been proposed, primarily categorized into anonymization methods and encryption methods.

Although these methods have demonstrated effectiveness in enhancing WBAN system security, they still have certain limitations. Firstly, the existing methods often focus on static privacy threats encountered by specific nodes at a single stage, without designing dynamic privacy protection schemes based on a comprehensive analysis of the privacy risks faced by all WBAN sensors, leading to reduced data availability. For example, full encryption improves security but can consume excessive computational resources, while only adding noise for protection significantly reduces data accuracy. Secondly, these methods often ignore systematic privacy risk analysis when integrating privacy protection schemes. Such neglect can lead to severe consequences: if the privacy protection schemes do not match the actual privacy risks, the data may remain vulnerable to privacy breaches due to insufficient protection, or the efficiency of data transmission and mining may decrease due to overly complex protection schemes. Therefore, conducting a comprehensive assessment of the overall privacy risks in the dynamic data streams of the WBAN system is crucial for designing and delivering optimized privacy protection schemes. Such assessments can more effectively balance the relationship between privacy protection and data usability, achieving more efficient security safeguards.

SUMMARY

Therefore, the present disclosure provides a method for protecting data in a Wireless Body Area Network (WBAN) system to solve the problems existing in current privacy protection schemes for WBAN system, such as the lack of consideration for dynamic privacy threats, direct privacy protection without considering privacy risk levels, and low data transmission and mining efficiency under privacy protection schemes.

To achieve the above objectives, the technical solutions provided herein are as follows.

A method for protecting data in a Wireless Body Area Network (WBAN) system, comprising:
  (S1) monitoring and obtaining a current status of a data in a WBAN system; wherein the current status is one of the following: a collection status, a transmission status, a sharing status, a mining status, a storage status and a destruction status;
  (S2) assessing a potential risk to the data in the current status, based on nodes in the WBAN system and a path between the nodes, to obtain the potential risk to the data; wherein the nodes comprise a hardware device or a virtual device in the WBAN system that process the data;
  (S3) quantifying a risk level of the WBAN system by calculating a risk degree of the potential risk under attack methods to obtain the risk level of the WBAN system; wherein the attack methods comprise addition, deletion, modification, query and restriction for the data by an attacker;
  (S4) selecting a plurality of first protection schemes from a plurality of second protection schemes based on the risk level of the WBAN system;
  (S5) evaluating the plurality of first protection schemes based on Analytic Hierarchy Process (AHP), by taking the attack methods, an utility of each of the plurality of first protection schemes, and an efficiency of each of the plurality of first protection schemes as evaluation indicators, to select a third protection scheme from the plurality of first protection schemes; and
  (S6) processing the data according to the third protection scheme to protect the data, until the current status changes, then returning to the step (S2).

In an embodiment, the step of processing the data according to the third protection scheme to protect the data comprises:
  encrypting the data using a homomorphic decryption algorithm to enable computation on the data without decrypting the data when the third protection scheme is homomorphic encryption; wherein the homomorphic decryption algorithm comprises Brakerski-Fan-Vercauteren (BFV) homomorphic encryption algorithm and Cheon-Kim-Kim-Song (CKKS) homomorphic encryption algorithm.

In an embodiment, the step of processing the data according to the third protection scheme to protect the data comprises:
  adding a random noise to the data when the third protection scheme is differential privacy; wherein the random noise comprises a Laplace noise and a Gaussian noise.

In an embodiment, the step of calculating a risk degree of the potential risk under the attack methods comprises:
  calculating the risk degree of the potential risk under the attack methods based on an occurrence probability of the potential risk under the attack methods and a loss severity of the potential risk.

In an embodiment, the risk level of the WBAN system comprises a first level, a second level, and a third level; the plurality of second protection schemes comprise access control, periodic backup and recovery strategy, K-anonymity, data masking, trusted execution environment, homomorphic encryption, differential privacy, secure multi-party computation, and federated learning; the step of selecting the plurality of first protection schemes from the plurality of second protection schemes based on the risk level of the WBAN system comprises:

- if the risk level is the first level, determining the access control and the periodic backup and recovery strategy as the plurality of first protection schemes; or
- if the risk level is the second level, determining the K-anonymity, the data masking and the trusted execution environment as the plurality of first protection schemes; or
- if the risk level is the third level, determining the homomorphic encryption, the differential privacy, the secure multi-party computation and the federated learning as the plurality of first protection schemes;
- wherein a risk severity represented by the third level is greater than a risk severity represented by the second level, and the risk severity represented by the second level is greater than a risk severity represented by the first level.

Firstly, a privacy protection indicator system for the WBAN system is established, and the indicators of the system include attract methods (risk indicators), the utility and efficiency of the privacy protection schemes. Further, the risk indicators are categorized into five types: addition, deletion, modification, query, and restriction.

Next, the risk quantity system is established. The concept of risk degree D is introduced, representing the likelihood of occurrence and the degree of loss for each risk indicator. The calculation process is as follows:

$$D = P \times L;$$

In the above formula, P represents the likelihood of occurrence and L represents the degree of loss for the risk indicator. Assuming the total risk set in node n is M, $M=\{m_1, m_2, \ldots, m_N\}$; the probability of occurrence of risk k is calculated as:

$$P_k = \frac{m_k}{m_1 + m_2 + \ldots + m_N}.$$

Furthermore, L is quantified using the Delphi method. Then, the risk weights of each indicator in the risk system are calculated using the AHP.

(1) A judgment matrix J is created for the five risk indicators (addition, deletion, modification, query, restriction) based on pairwise comparisons. The equation of the judgment matrix is: $J=(a_{ij})n^2$.

(2) By the square root method, the eigenvalues and eigenvectors of the judgment matrix is calculated. The product of elements in each row of the judgment matrix is calculated as follows:

$$M_j = \prod_{j=1}^{n} a_{ij} (i = 1, 2, \ldots, n); \text{ and}$$

$$\overline{W_1} = \overline{W_J} = \sqrt[n]{M_i} (i = 1, 2, \ldots, n; j = 1, 2, \ldots, n).$$

The eigenvector is normalized to weights, expressed by:

$$W_i = \frac{\overline{W_1}}{\sum_{j=1}^{n} \overline{W_J}}; \text{ and } W_A = [W_1, W_2, \ldots, W_n]^T.$$

The largest eigenvalue is calculated as follows:

$$\lambda_{max} = \sum_{i=1}^{n} \frac{(AW)_i}{nW_i};$$

In the above formula, $(AW)_i$ represents the row-wise accumulation of values in the judgment matrix normalized to weights.

(3) Consistency Check: The consistency index (C.I.) is defined as follows:

$$C.I. = \frac{\lambda_{max} - n}{n - 1}.$$

Generally, C.I.≤0.1 indicates that judgment matrix J has consistency.

The risk level is multiplied by the weight corresponding to each risk indicator. The risk assessment level is divided into five levels: extreme, high, medium, low and lowest. Since the judgment error increases with the increase of n, we need to consider the influence of n and use C. R for consistency judgment, expressed by:

$$C.R. = \frac{C.I.}{R.I.};$$

In the above formula, R. I is the average random consistency index (see FIG. 9).

(4) The total risk score for each privacy protection scheme is calculated, and the optimal privacy protection scheme for the current stage of vital sign data in the WBAN system is selected. The aggregated risk score is calculated as:

$$S = s_1 * s_{\omega 1} + s_2 * s_{\omega 2} + \ldots + s_n * s_{\omega n};$$

In the above formula, $s_n$ represents the score of the privacy protection scheme for indicator n, and $s_{\omega n}$ represents the weight of the score of the privacy protection scheme for the indicator n. By repeating the above steps, the optimal privacy protection scheme for the entire lifecycle of the WBAN system can be dynamically selected.

The present disclosure has benefits as follows.

A privacy risk assessment method provided herein comprehensively evaluates the risks of nodes in the multi-scenario environments of the WBAN system, provides support for the selection for privacy protection schemes and categorizes privacy risks. It improves the selection method for privacy protection schemes for the vital sign data in the multi-scenario environments of the WBAN system by designing a privacy protection scheme selection method based on hierarchical analysis, enabling dynamic security throughout the entire data lifecycle. This method is applied to multimodal computation in the WBAN system, incorporating a generalized multimodal computation model to ensure the security, effectiveness, and efficiency of data computation throughout the data lifecycle in the WBAN system.

BRIEF DESCRIPTION OF THE DRAWINGS

FIG. 2 schematically shows the risk analysis results according to an embodiment of the present disclosure;

FIG. 3 schematically shows the results of the privacy protection scheme selection according to an embodiment of the present disclosure;

FIG. 6 schematically shows the baseline comparison results of the single-node model according to an embodiment of the present disclosure;

FIG. 7 schematically shows the baseline comparison results of the multi-node model according to an embodiment of the present disclosure;

FIG. 8 schematically shows quantitative judgment rules table according to an embodiment of the present disclosure; and FIG. 9 is an average random consistency index table according to an embodiment of the present disclosure.

DETAILED DESCRIPTION OF EMBODIMENTS

Figure 1:
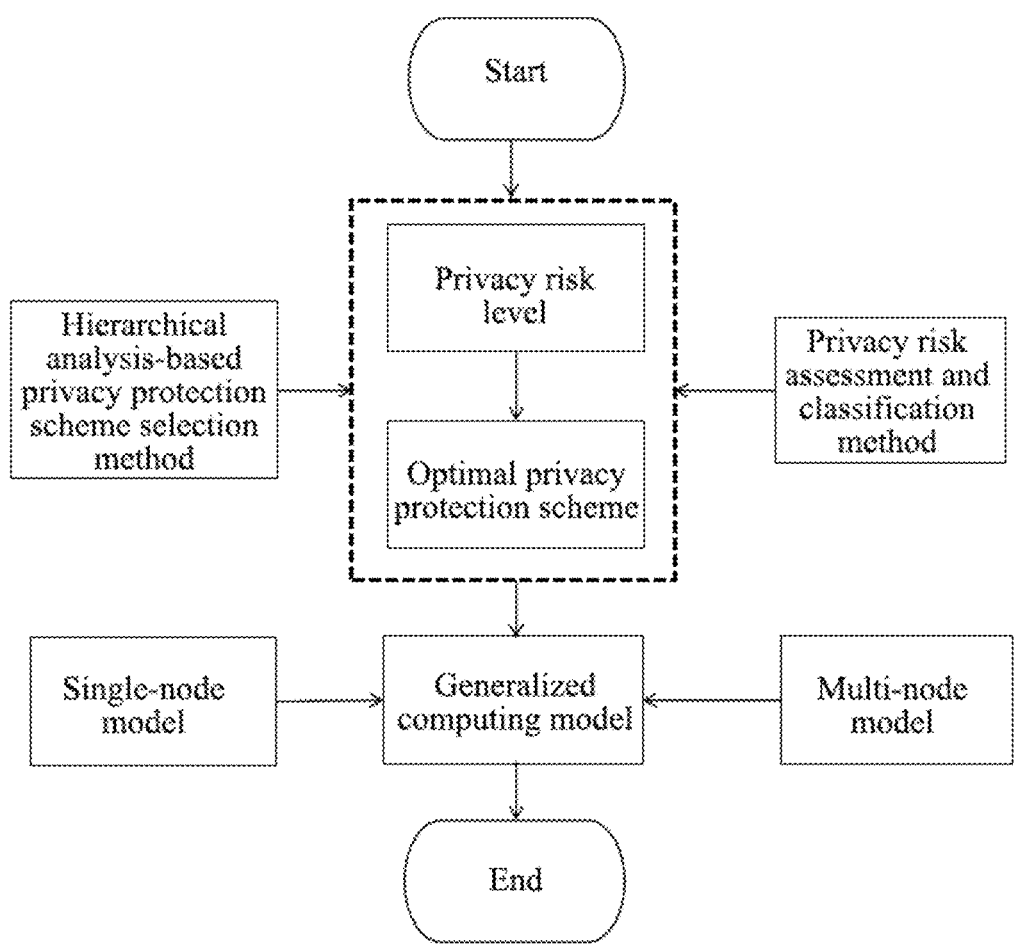
FIG. 1 is a flowchart of the method for protecting data in a WBAN system according to an embodiment of the present disclosure.

The following describes the embodiments of the present disclosure through specific embodiments. Those skilled in the art can readily understand other advantages and benefits of the present disclosure based on the disclosure of this specification. Obviously, described below are merely some embodiments of the present disclosure rather than all embodiments. Based on the embodiments provided herein, all other embodiments obtained by those skilled in the art without making creative efforts shall fall within the scope of the present disclosure.

The present disclosure provides a dynamic secure computing model for the full lifecycle of data in WBAN system, including a sensor and a data transmission path. The sensor is configured to transmit a vital sign data and to be defined as a node; the data transmission path is configured to be defined as a path; and the dynamic secure computing model is configured to work on a single-node computing scenario and a multi-node computing scenario.

In the single-node computing scenario, an optimal privacy protection scheme is determined by a privacy protection scheme selection method based on hierarchical analysis and a privacy risk assessment is determined by a privacy risk assessment and classification method throughout the full lifecycle of the vital sign data. The full lifecycle of the vital sign data includes a collection status, a transmission status, a sharing status, a mining status, a storage status and a destruction status of the vital sign data. The dynamic secure computing model in the single-node computing scenario performs steps as follows.

(S1.1) The privacy risk assessment and selection of the optimal privacy protection scheme is initiated upon the WBAN system accepts the data mining request from the cloud.

(S1.2) The privacy risk of each of the plurality of regional nodes is calculated to select the optimal privacy protection scheme for each of the plurality of regional nodes. The privacy risk of each of the local nodes is the sum of the risk value of the local nodes and the risk value of the local paths within each of the plurality of regional nodes.

(S1.3) When the local nodes communicate with the cloud computing node to transmit data, the privacy risk is transformed into a risk domain and the risk domain is calculated as the risk value of nodes on the communication path between local nodes and the cloud computing node to select the optimal privacy protection scheme.

The dynamic secure computing model includes the central model and the local model. In the multi-node computing scenario, the global model is configured to collect the contribution of the local model. The global training is based on the privacy protection scheme selection method and the privacy risk assessment and classification method. The central model is configured to initialize training objectives. The training objectives include the accuracy, the training round, the risk assessment and the privacy protection scheme selection. The local model is configured to obtain and analyze the training objectives. The local model is configured to calculate risk value, select the optimal privacy protection scheme and upload parameters of the local model to the risk value of the central model for the privacy risk assessment. The central model is configured to assess the performance of the local model based on the training objectives. The global training is configured to end until the training objectives are met.

In an embodiment, the privacy risk assessment and classification method is designed as follows.

In a process of the vital sign data transferred from the sensor to the WBAN system, the privacy risk of the node varies with changes in a network environment. Definitions of the privacy risk domain for the node and the path in different WBAN system scenarios include definition 1, definition 2 and definition 3.

Definition 1: the local privacy risk: the set of the privacy risk of the node is privacy risk during the sensor storing the vital sign data locally in the WBAN system.

Definition 2: the small-scale privacy risk: the privacy risk domain $o_{ij}$ faced by the node i and the path j during communication represents privacy risk during the interconnection of two or more of the sensor in the WBAN system.

Definition 3: the global privacy risk: the privacy risk domain $o_{ij}$ faced by the node i, the computation node c and the path j during communication with cloud computing represents aggregated privacy risk between the sensor and the cloud computing system during the sensor uploading the vital sign data.

Paths with the length Q are faced by the same probability and the same type of privacy risk ($0<Q<+\infty$) and are defined as consistent with the network environment. If $Q\rightarrow 0$, the path with the length Q is considered as the node.

Based on the definition 1, the definition 2 and the definition 3, theorems of the privacy risk assessment include theorem 1 and theorem 2.

Theorem 1: for the small-scale risk and the global privacy risk, if the network environment of any node on the communication path is the same, the risk value of the path is equal to the risk value of any node in the path.

Theorem 2: for the local privacy risk, the risk value of the node is equal to the risk value of each of sub-nodes and sub-paths within the node.

The privacy protection scheme selection method includes the following steps.

(S1.4) Five risk indicators throughout the lifecycle are balanced by using Analytic Hierarchy Process (AHP) for risk analysis and classification into privacy risk levels. The five risk indicators are addition, deletion, modification, query and restriction.

(S1.5) The privacy protection scheme is scored based on the privacy risk, the utility and the efficiency of the protection scheme.

(S1.6) The AHP result is divided into an ordered hierarchical structure to obtain privacy risk levels.

(S1.7) The optimal privacy protection scheme is selected for multi-scenario and multi-stage applications based on an objective judgment result of the AHP.

The privacy protection scheme selection method is described specifically as follows.

Firstly, the privacy protection indicator system for the WBAN system is established, including risk indicators, utility, and efficiency. Specifically, the risk indicators are categorized into five types: addition, deletion, modification, query, and restriction.

Next, the risk quantity system is established. The concept of risk degree D is introduced, representing the likelihood of occurrence and the degree of loss for each risk indicator. The calculation process is as follows:

$$D = P \times L;$$

In the above formula, P represents the likelihood of occurrence and L represents the degree of loss for a risk indicator. Assuming the total risk set in node n is S, $M = \{m_1, m_2, \ldots, m_N\}$; the probability of occurrence of risk k is calculated as:

$$P_k = \frac{m_k}{m_1 + m_2 + \ldots + m_N}.$$

Furthermore, L is quantified using the Delphi method. Then, the risk weights of each indicator in the risk system are calculated using the AHP.

(1) A judgment matrix J is created for the five risk indicators (addition, deletion, modification, query, restriction) based on pairwise comparisons. The equation of the judgment matrix is: $J = (a_{ij})n^2$. The quantification rules are as shown in FIG. 8. For example, if factors a and b are equally important, the value is 1. If a is slightly more important than b, the value is 3; conversely, if b is slightly more important than a, the value is ⅓. Intermediate values (e.g., 2) are used when the importance is between two levels, and so on.

(2) By the square root method, the eigenvalues and eigenvectors of the judgment matrix are calculated. The product of elements in each row of the judgment matrix is calculated as follows:

$$M_j = \prod_{j=1}^{n} a_{ij} (i = 1, 2, \ldots, n); \text{ and}$$

$$\overline{W_1} = \overline{W_j} = \sqrt[n]{M_i} (i = 1, 2, \ldots, n; j = 1, 2, \ldots, n).$$

The eigenvector is normalized to weights, expressed by:

$$W_i = \frac{\overline{W_1}}{\sum_{j=1}^{n} \overline{W_j}}; \text{ and } W_A = [W_1, W_2, \ldots, W_n]^T.$$

The largest eigenvalue is calculated as follows:

$$\lambda_{max} = \sum_{i=1}^{n} \frac{(AW)_i}{nW_i};$$

In the above formula, $(AW)_i$ represents the row-wise accumulation of values in the judgment matrix normalized to weights.

(3) Consistency Check: The consistency index (C.I.) is defined as follows:

$$C.I. = \frac{\lambda_{max} - n}{n - 1}.$$

Generally, C.I.≤0.1 indicates that judgment matrix J has consistency.

The risk level is multiplied by the weight corresponding to each risk indicator. The risk assessment level is divided into five levels: highest, high, medium, low and lowest. Since the judgment error increases with the increase of n, we need to consider the influence of n and use C. R for consistency judgment, expressed by:

$$C.R. = \frac{C.I.}{R.I.};$$

In the above formula, R. I is the average random consistency index (see FIG. 9).

(4) The total risk score for each privacy protection scheme is calculated, and the optimal privacy protection scheme for the current stage of vital sign data in the WBAN system is selected. The aggregated risk score is calculated as:

$$S = s_1 * s_{\omega 1} + s_2 * s_{\omega 2} + \ldots + s_n * s_{\omega n};$$

In the above formula, $s_n$ represents the score of the privacy protection scheme for indicator n, and $s_{\omega n}$ represents the weight of the score of the privacy protection scheme for the indicator n. By repeating the above steps, the optimal privacy protection scheme for the entire lifecycle of the WBAN system can be dynamically selected.

Embodiment 1: Process of Risk Analysis and Privacy Protection Scheme Selection

The above methods for privacy risk assessment, classification, and privacy protection scheme selection based on AHP are applied to the data mining process to demonstrate their performance. A customized risk classification standard is used to calculate risk values. In addition, the encryption and differential privacy are used as examples of privacy protection schemes to ensure the security of the data mining process.

Risk analysis is conducted. Based on the risk classification method described above, the data mining process faces five types of risks: addition, deletion, modification, query, and restriction. The AHP method is used to calculate risk values and determine risk levels, as shown in FIG. 2. FIG. 2 shows the risk levels for the five categories of privacy risks, represented as Normalized D (the normalized risk degree D), with values of 2.65%, 0.09%, 0.76%, 22.96%, and 73.54%, respectively. Evidently, the "restriction" risk is the highest, as it directly compromises data privacy. Additionally, "restriction" occurs 64.5 times more frequently than the "deletion" risk. The "query" risk level is the second highest, as original data can be obtained through queries. The "addition" risk, which grants access to partial private data, is less likely to occur than the previous two risks. The levels of "deletion" and "modification" risks are relatively low.

Privacy protection scheme selection is carried out. Considering the levels of privacy risk, suitable privacy protection schemes are selected, as shown in FIG. 3. This embodiment considers three factors: data utility, privacy protection level, and method efficiency. First, the weights of data utility, privacy protection level and method efficiency are analyzed. Then, the scores of the two privacy protection schemes, encryption and differential privacy, are calculated. Finally, the total scores of the two methods are computed based on their weights and scores, as shown in FIG. 3 (DP represents differential privacy, which is a method of differential privacy, and EN represents encryption). The differential privacy method performs worse than the encryption method in terms of data utility and privacy protection level. Although the differential privacy method is more efficient, the data mining process prioritizes data utility and privacy protection level. Therefore, an encryption-based privacy protection scheme can be selected during the data mining process.

Embodiment 2: Performance Analysis of the Generalized Multimodal Computing Model M3

Figure 4A:
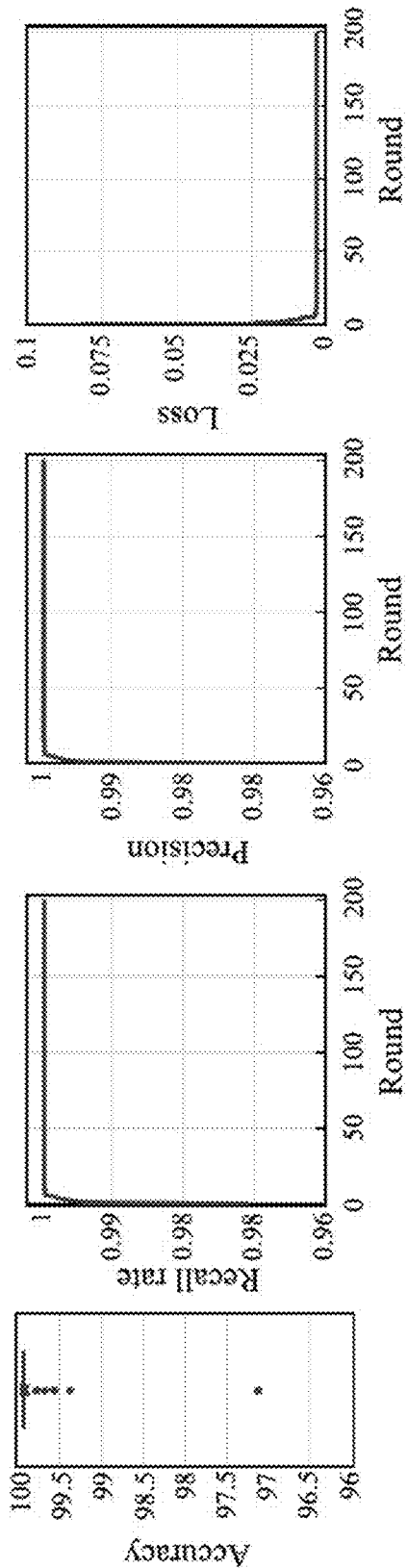
FIG. 4a is a schematic diagram of the performance analysis results of the single-node model according to an embodiment of the present disclosure.
Figure 4B:
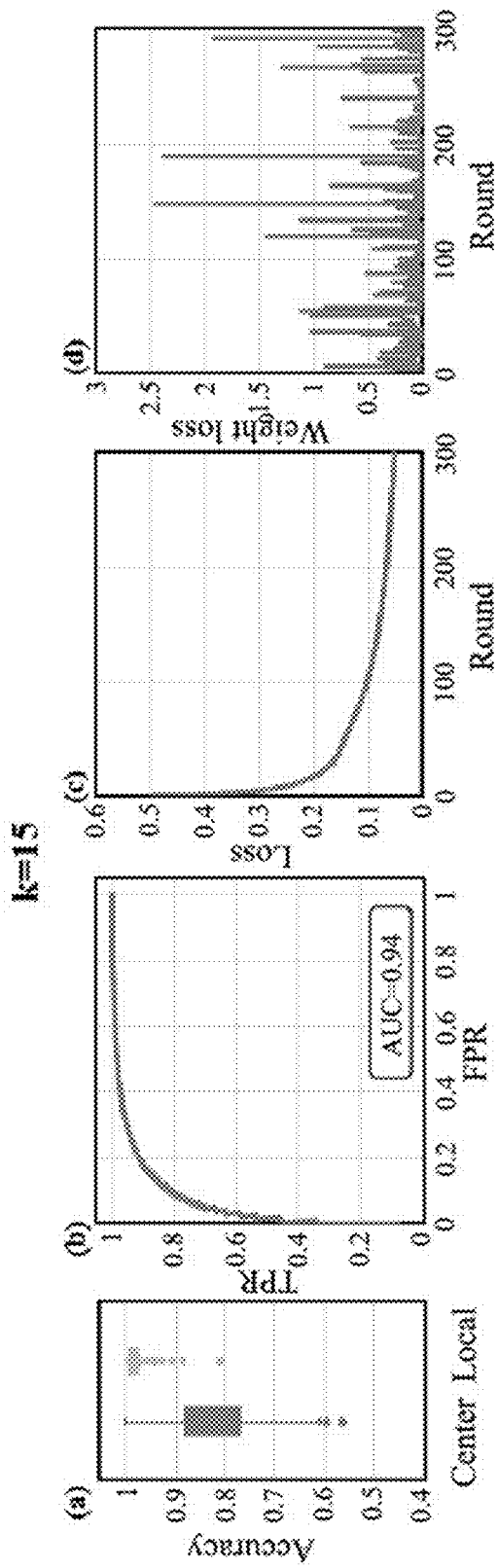
FIG. 4b is a schematic diagram of the performance analysis results of the multi-node model with 15 clients according to an embodiment of the present disclosure.
Figure 4C:
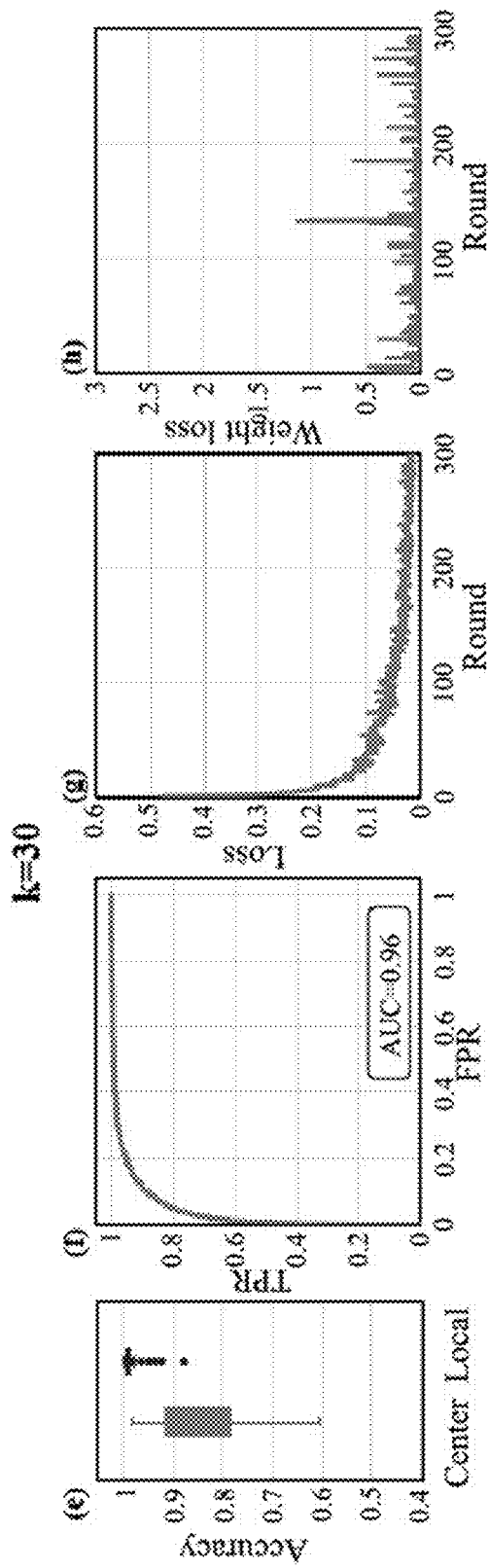
FIG. 4c is a schematic diagram of the performance analysis results of the multi-node model with 30 clients according to an embodiment of the present disclosure.
Figure 4D:
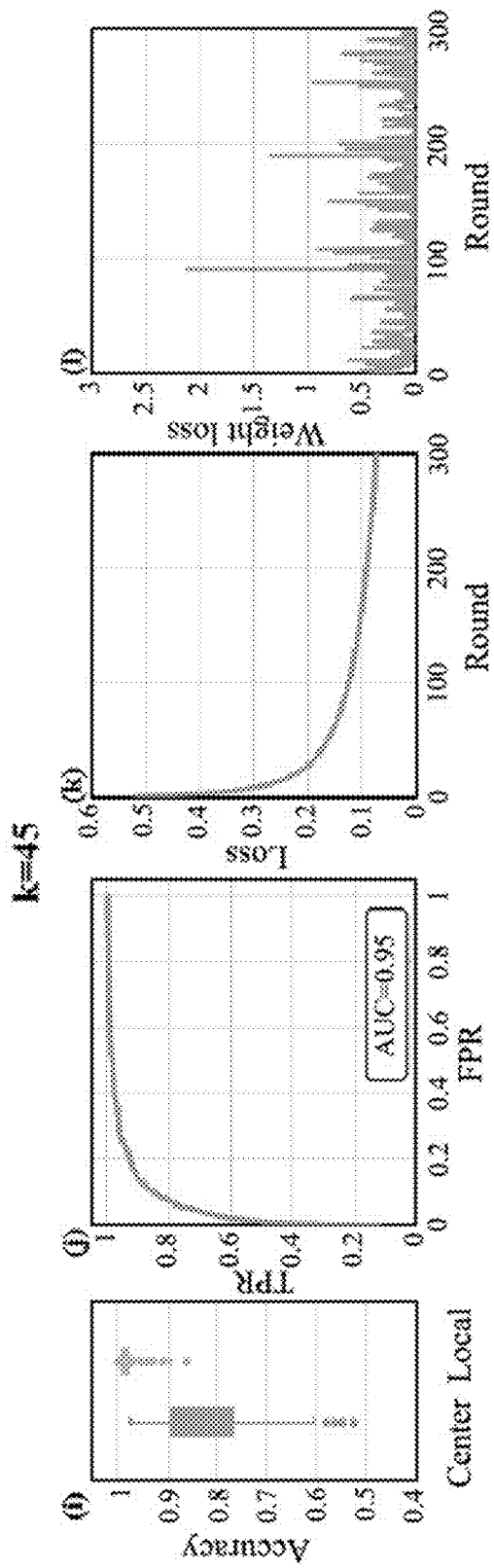
FIG. 4d is a schematic diagram of the performance analysis results of the multi-node model with 45 clients according to an embodiment of the present disclosure.
Figure 4E:
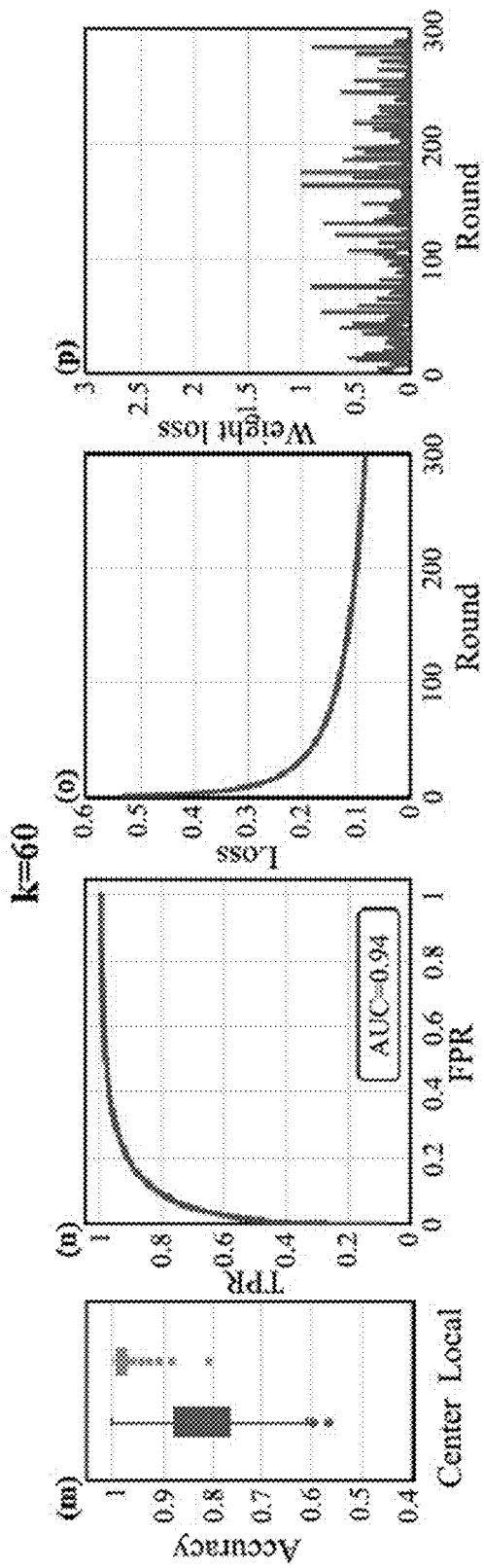
FIG. 4e is a schematic diagram of the performance analysis results of the multi-node model with 60 clients according to an embodiment of the present disclosure.

To verify the effectiveness of the proposed M3 module (an integrated module for single-node and multi-node models), the computational model for the single-node scenario is referred to as the single-node model, and for the multi-node scenario, it is referred to as the multi-node model (as shown in FIG. 1). In this embodiment, experiments are conducted to analyze the performance of the single-node and multi-node models, respectively. The CMDC dataset is used for single-node model experiments, while the MPower dataset is used for multi-node model experiments. The experimental results are shown in FIG. 4a and FIGS. 4b-e. FIG. 4a illustrates the performance of the single-node model. It can be observed that this model achieves high detection accuracy, with an average accuracy (ACC) exceeding 99%. The recall and precision curves indicate that the model converges rapidly and stably, while the loss curve demonstrates that the model exhibits excellent fitting performance. FIGS. 4b-e show the performance of the multi-node model under varying numbers of clients. In terms of accuracy, the local model's average accuracy surpasses that of the central model because the central node only performs weight aggregation, and a small amount of data is used to test model accuracy. When the number of clients k reaches 30, the model achieves its highest ACC and area under the curve (AUC) values. Additionally, the model loss converges stably to zero, with low and stable weight loss.

These results indicate that the proposed multimodal model exhibits high performance. Furthermore, for multi-node mining tasks, it is recommended to use 30 clients.

Figure 5A:
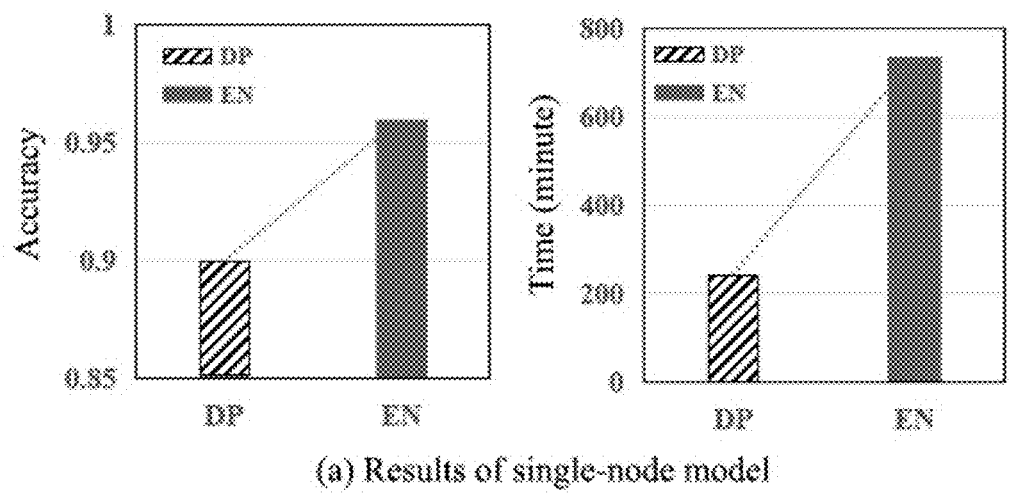
FIG. 5a is a schematic diagram of the performance analysis results of the single-node model with privacy protection schemes according to an embodiment of the present disclosure.
Figure 5B:
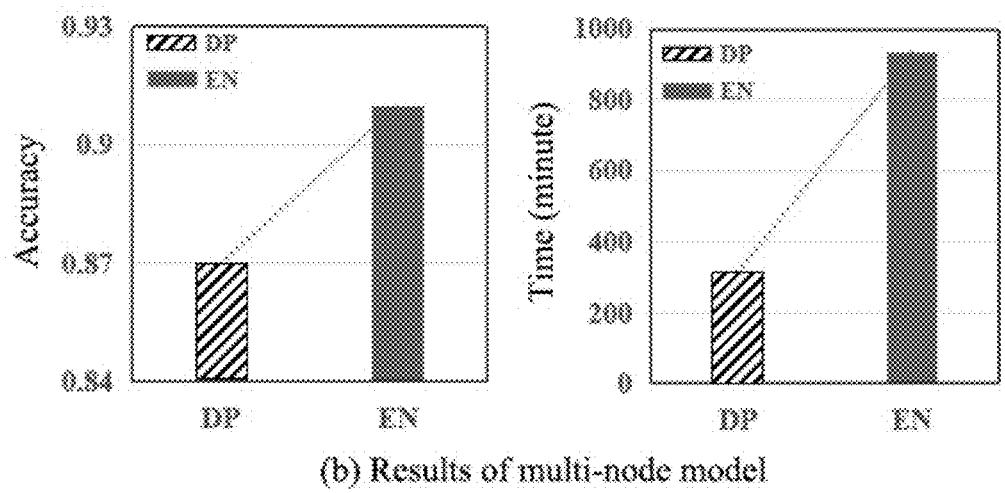
FIG. 5b is a schematic diagram of the performance analysis results of the multi-node model with privacy protection schemes according to an embodiment of the present disclosure.

Embodiment 3: Performance of the Computational Model with Privacy Protection Schemes To demonstrate the effectiveness of the privacy protection selection method, experiments were conducted using differential privacy (DP) and homomorphic encryption (EN) methods. The experimental results are shown in FIG. 5a and FIG. 5b. FIG. 5a and FIG. 5b respectively illustrate the accuracy and runtime of the single-node and multi-node models with DP and homomorphic EN methods. In the single-node mining model, the runtime of DP method is shorter than that of EN method because EN method involves more complex operations. However, EN method achieves higher accuracy than DP method. Since DP method adds noise during the mining process to protect data privacy, it reduces the data's utility. In the multi-node model, DP method demonstrates higher efficiency compared to EN method. Furthermore, due to parameter aggregation and insufficient validation data, the efficiency and detection accuracy of the multi-node model are lower than those of the single-node model.

Embodiment 4: Baseline Comparison

The proposed M3 model was compared with existing methods, and the comparison results are shown in FIG. 6 and FIG. 7. Metrics in FIG. 6 include: Linear Support Vector Machine (SVM (Linear)), Support Vector Machine based on Sequential Minimal Optimization (SVM (SMO)), Logistic Regression (Logistic), Naive Bayes and Bidirectional Long Short-Term Memory Network based on Early Fusion (Bi-LSTM (Early Fusion)). Metrics in FIG. 7 include the Low-Rank Multimodal Fusion Method (LWF). The proposed single-node model performed well across all four evaluation metrics compared to the five algorithms. For the proposed multi-node model, the maximum recall rate difference between it and the comparative algorithms was 0.58, and the minimum ACC difference was 0.27. The results demonstrate that the models proposed in this disclosure exhibit excellent performance.

Described above are merely preferred embodiments of this application, and are not intended to limit this application. It should be understood by those skilled in the art that any modifications, equivalent substitutions, and improvements made without departing from the spirit of this application shall fall in the scope of this application defined by the appended claims.

What is claimed is:

1. A method for protecting data in a Wireless Body Area Network (WBAN) system, comprising:
   (S1) monitoring and obtaining a current status of a data in a WBAN system;
   wherein the current status is one of the following: a collection status, a transmission status, a sharing status, a mining status, a storage status and a destruction status;
   (S2) assessing a potential risk to the data in the current status, based on nodes in the WBAN system and a path between the nodes, to obtain the potential risk to the data;
   wherein the nodes comprise a hardware device or a virtual device for processing the data in the WBAN system;

(S3) quantifying a risk level of the WBAN system by calculating a risk degree of the potential risk under attack methods to obtain the risk level of the WBAN system;
wherein the attack methods comprise addition, deletion, modification, query and restriction for the data by an attacker;
(S4) selecting a plurality of first protection schemes from a plurality of second protection schemes based on the risk level of the WBAN system;
(S5) evaluating the plurality of first protection schemes based on Analytic Hierarchy Process (AHP), by taking the attack methods, an utility of each of the plurality of first protection schemes and an efficiency of each of the plurality of first protection schemes as evaluation indicators, to select a third protection scheme from the plurality of first protection schemes; and
(S6) processing the data according to the third protection scheme to protect the data, until the current status changes, then returning to the step (S2).

2. The method of claim 1, wherein the step of processing the data according to the third protection scheme to protect the data comprises:
encrypting the data using a homomorphic decryption algorithm to enable computation on the data without decrypting the data when the third protection scheme is homomorphic encryption; wherein the homomorphic decryption algorithm comprises Brakerski-Fan-Vercauteren (BFV) homomorphic encryption algorithm and Cheon-Kim-Kim-Song (CKKS) homomorphic encryption algorithm.

3. The method of claim 1, wherein the step of processing the data according to the third protection scheme to protect the data comprises:
adding a random noise to the data when the third protection scheme is differential privacy; wherein the random noise comprises Laplace noise and Gaussian noise.

4. The method of claim 1, wherein the step of calculating the risk degree of the potential risk under the attack methods comprises:
calculating the risk degree of the potential risk under the attack methods based on an occurrence probability of the potential risk under the attack methods and a loss severity of the potential risk.

5. The method of claim 1, wherein the risk level of the WBAN system comprises a first level, a second level, and a third level; the plurality of second protection schemes comprise access control, periodic backup and recovery strategy, K-anonymity, data masking, trusted execution environment, homomorphic encryption, differential privacy, secure multi-party computation, and federated learning; the step of selecting the plurality of first protection schemes from the plurality of second protection schemes based on the risk level of the WBAN system comprises:
if the risk level is the first level, determining the access control and the periodic backup and recovery strategy as the plurality of first protection schemes; or
if the risk level is the second level, determining the K-anonymity, the data masking and the trusted execution environment as the plurality of first protection schemes; or
if the risk level is the third level, determining the homomorphic encryption, the differential privacy, the secure multi-party computation and the federated learning as the plurality of first protection schemes;
wherein a risk severity represented by the third level is greater than a risk severity represented by the second level, and the risk severity represented by the second level is greater than a risk severity represented by the first level.

* * * * *